United States Patent
Heck et al.

(10) Patent No.: US 8,011,738 B2
(45) Date of Patent: Sep. 6, 2011

(54) FABRICATED BEAD SEAT ATTACHED VEHICLE WHEEL, WHEEL DISC FOR SUCH WHEEL AND METHOD FOR PRODUCING SAME

(75) Inventors: Thomas E. Heck, Monroe, MI (US); Alan Coleman, Southgate, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 107 days.

(21) Appl. No.: 12/421,257

(22) Filed: Apr. 9, 2009

(65) Prior Publication Data

US 2010/0259094 A1 Oct. 14, 2010

(51) Int. Cl.
*B60B 3/10* (2006.01)
*B21D 53/26* (2006.01)

(52) U.S. Cl. .......... 301/63.103; 301/63.104; 29/894.322

(58) Field of Classification Search .............. 301/63.101, 301/63.103, 63.104, 64.101, 64.307; 29/894.32, 29/894.322, 894.325
See application file for complete search history.

(56) References Cited

U.S. PATENT DOCUMENTS

| | | | | |
|---|---|---|---|---|
| D103,741 | S * | 3/1937 | Pattison | D12/211 |
| 5,188,429 | A * | 2/1993 | Heck et al. | 301/64.307 |
| 5,544,945 | A * | 8/1996 | Daudi | 301/64.101 |
| 5,577,810 | A | 11/1996 | Abe et al. | |
| 5,694,687 | A | 12/1997 | Coleman | |
| 5,899,537 | A * | 5/1999 | Abe et al. | 301/63.101 |
| 6,036,280 | A | 3/2000 | Stanavich | |
| 6,282,788 | B1 * | 9/2001 | Politi et al. | 29/894.323 |
| 6,517,165 | B1 | 2/2003 | Handa | |
| 6,935,704 | B2 | 8/2005 | Guimard et al. | |
| 2008/0054714 | A1 * | 3/2008 | Morrow | 301/63.101 |

FOREIGN PATENT DOCUMENTS

JP 10109501 A * 4/1998

* cited by examiner

*Primary Examiner* — Kip Kotter
(74) *Attorney, Agent, or Firm* — MacMillan, Sobanski & Todd, LLC

(57) ABSTRACT

A fabricated bead seat attached vehicle wheel includes a wheel rim and wheel disc joined together. The wheel rim includes an inboard tire bead seat retaining flange, an inner tire bead seat, a well, an outer tire bead seat, and an outboard tire bead seat retaining flange. The wheel defines a wheel axis and includes a generally centrally located wheel mounting portion and an outer annular portion which defines a wheel disc outer flange The wheel disc outer annular flange is segmented around a circumference thereof and includes at least a first plurality of segments and a second plurality of segments. The first plurality of segments extending a first axial distance relative to an adjacent outer surface of the wheel disc and the second plurality of segments extending a second axial distance relative to the adjacent outer surface of the wheel disc which is less than the first axial distance.

22 Claims, 7 Drawing Sheets

FABRICATED BEAD SEAT ATTACHED VEHICLE WHEEL, WHEEL DISC FOR SUCH WHEEL AND METHOD FOR PRODUCING SAME

BACKGROUND OF THE INVENTION

This invention relates in general to fabricated vehicle wheels and in particular to an improved fabricated bead seat attached vehicle wheel, wheel disc for such wheel, and method for producing the same.

A conventional fabricated bead seat attached vehicle wheel is of a two-piece construction and includes an inner wheel disc and an outer "full" wheel rim. The wheel disc can be cast, forged or fabricated from steel, aluminum, or other alloys, and includes an inner annular wheel mounting portion and an outer annular portion. The wheel mounting portion defines an inboard mounting surface and includes a center pilot or hub hole, and a plurality of lug receiving holes formed therethrough for mounting the wheel to an axle of the vehicle. The wheel rim can be cast, forged or fabricated from steel, aluminum, or other alloys, and includes an inboard tire bead seat retaining flange, an inboard tire bead seat, an axially extending well, an outboard tire bead seat, and an outboard tire bead seat retaining flange. In some instances, a three-piece wheel construction having a mounting cup secured to the wheel disc is used. In both types of constructions, the outer annular portion of the wheel disc is secured to the wheel rim by welding.

SUMMARY OF THE INVENTION

This invention relates to an improved fabricated bead seat attached vehicle wheel. In one embodiment of the invention, the fabricated bead seat attached vehicle wheel includes a wheel rim and wheel disc joined together. The wheel rim includes an inboard tire bead seat retaining flange, an inner tire bead seat, a well, an outer tire bead seat, and an outboard tire bead seat retaining flange. The wheel defines a wheel axis and includes a generally centrally located wheel mounting portion and an outer annular portion which defines a wheel disc outer flange The wheel disc outer annular flange is segmented around a circumference thereof and includes at least a first plurality of segments and a second plurality of segments. The first plurality of segments extending a first axial distance relative to an adjacent outer surface of the wheel disc and the second plurality of segments extending a second axial distance relative to the adjacent outer surface of the wheel disc which is less than the first axial distance.

In another embodiment of the invention, a wheel disc adapted for use in producing a fabricated bead seat attached vehicle wheel comprises a wheel disc including a centrally located wheel mounting portion and an outer annular portion which defines a wheel disc outer flange. The wheel disc outer annular flange is segmented around a circumference thereof and includes at least a first plurality of segments and a second plurality of segments. The first plurality of segments extend a first axial distance relative to an adjacent outer surface of the wheel disc and the second plurality of segments extend a second axial distance relative to the adjacent outer surface of the wheel disc which is less than the first axial distance.

In yet another embodiment of the invention, a method for producing a fabricated bead seat attached vehicle wheel comprising the steps of: (a) providing a wheel rim including an inboard tire bead seat retaining flange, an inner tire bead seat, a well, an outer tire bead seat, and an outboard tire bead seat retaining flange; (b) providing a wheel disc defining a wheel axis and including a generally centrally located wheel mounting portion and an outer annular portion which defines a wheel disc outer flange, wherein the wheel disc outer annular flange is segmented around a circumference thereof and includes at least a first plurality of segments and a second plurality of segments, the first plurality of segments extending a first axial distance relative to an adjacent outer surface of the wheel disc and the second plurality of segments extending a second axial distance relative to the adjacent outer surface of the wheel disc which is less than the first axial distance; (c) moving at least one of the wheel rim and wheel disc relative to the other until the first plurality of segments engage an inner surface of the wheel rim; and (d) securing the wheel rim and the wheel disc together by welding.

Other advantages of this invention will become apparent to those skilled in the art from the following detailed description of the preferred embodiments, when read in light of the accompanying drawings.

DESCRIPTION OF THE PREFERRED EMBODIMENTS

Figure 1:
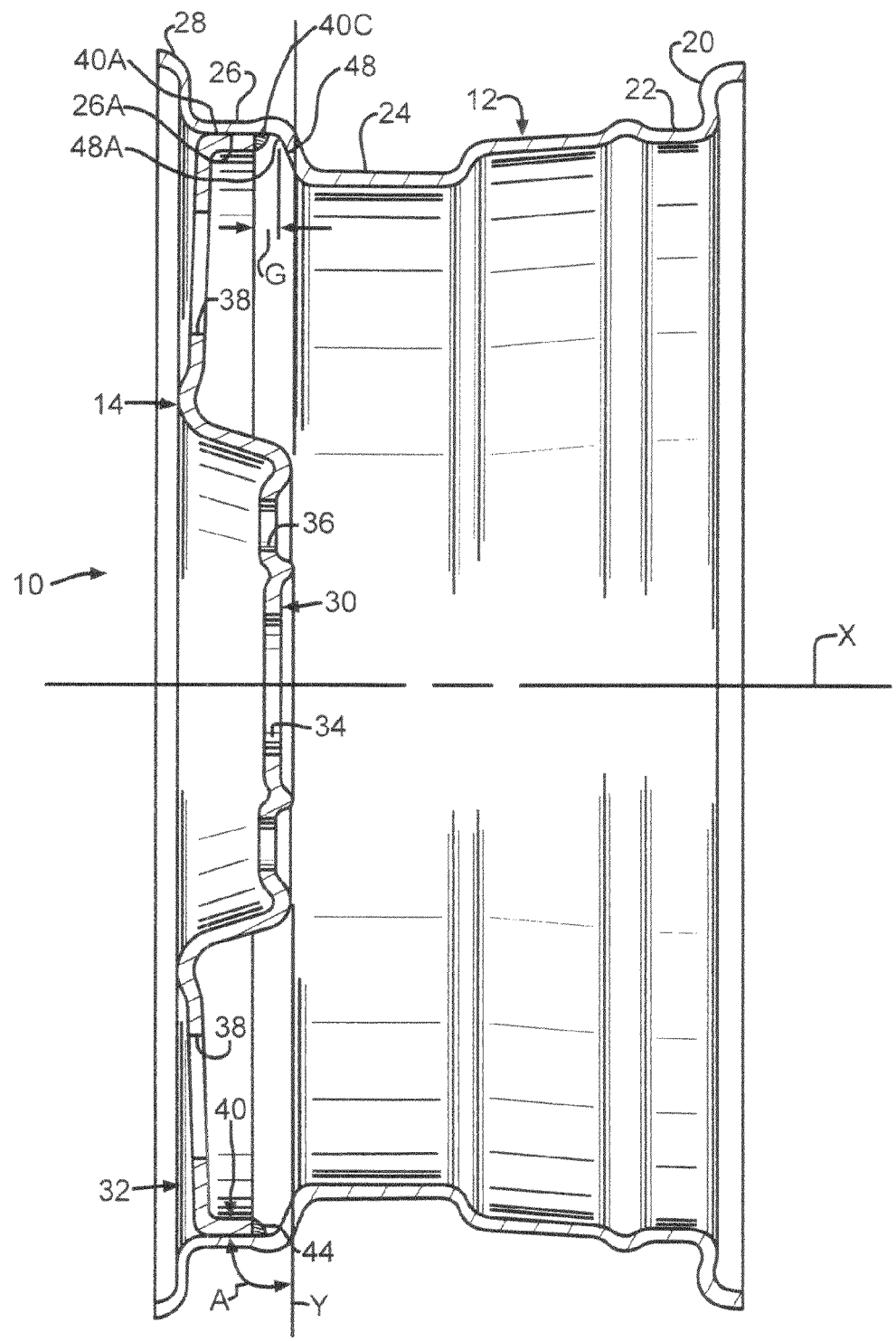
FIG. 1 is a sectional view of a prior art fabricated bead seat attached vehicle wheel.

Referring now to drawings, there is illustrated in prior art FIG. 1 a sectional view of a prior art fabricated bead seat attached vehicle wheel, indicated generally at 10. The prior art fabricated bead seat attached vehicle wheel 10 is generally the same as that shown in U.S. Pat. No. 6,282,788 to Politi et al, the disclosure of which is incorporated by reference herein in entirety. The general structure and operation of the prior art fabricated bead seat attached vehicle wheel 10 is conventional in the art. Thus, only those portions of the prior art fabricated bead seat attached vehicle wheel 10 that are necessary for a full understanding of this invention will be explained and illustrated.

As shown therein, the prior art fabricated bead seat attached vehicle wheel 10 includes a wheel rim 12, a wheel disc 14 and defines a wheel axis X. The prior art wheel rim 12 is cast, forged, fabricated or otherwise formed from a suitable material, such as for example, steel, aluminum or alloys thereof, steel, magnesium, or titanium. The wheel rim 12 includes an inboard tire bead seat retaining flange 20, an inboard tire bead seat 22, a generally axially extending well 24, an outboard tire bead seat 26, and an outboard tire bead seat retaining flange 28.

Figure 2:
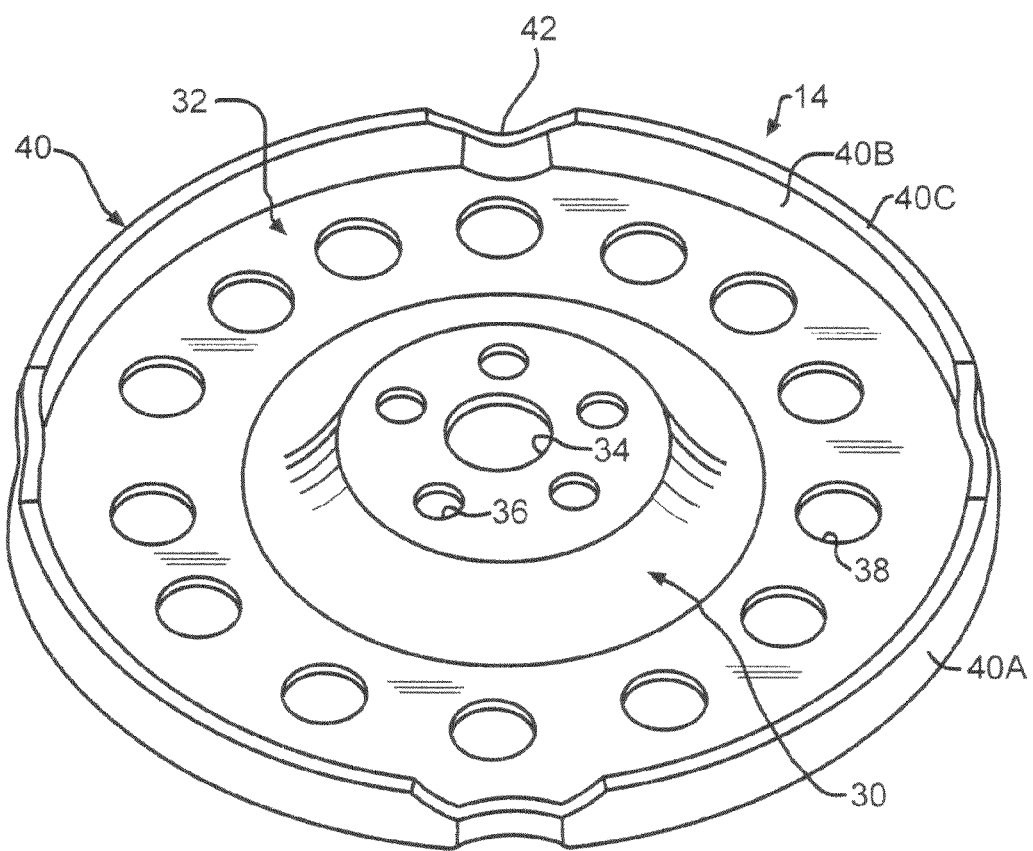
FIG. 2 is a view of the wheel disc of the prior art fabricated bead seat attached vehicle wheel illustrated in prior art FIG. 1.

The prior art wheel disc 14 is cast, forged, fabricated or otherwise formed from a suitable material, such as for example, steel, aluminum or alloys thereof, steel, magnesium, or titanium. The wheel disc 14 includes a generally centrally located wheel mounting portion 30 and an outer annular portion 32. The wheel mounting portion 30 includes a center hub hole 34 and a plurality of lug bolt mounting holes 36 (one of such lug bolt mounting holes 36 illustrated in prior art FIG. 1 and five of such lug bolt mounting holes 36 illustrated in prior art FIG. 2). The outer annular portion 32 includes a plurality of windows 38 (two of such windows 38 illustrated in prior art FIG. 1 and fourteen of such windows 38 illustrated in prior art FIG. 2).

The outer annular portion 32 of the prior art wheel disc 14 defines a wheel disc outer annular leg or flange 40. As shown in prior art FIG. 2, the flange 40 includes a generally axially extending outer side surface 40A, a generally axially extending inner side surface 40B, and a generally radially extending end surface 40C. Typically, the outer side surface 40A of the outer annular flange 40 of the wheel disc 14 is oriented at a predetermined angle A relative to a vertical axis Y of the wheel 10. Typically, the angle A is in the range from about 89 degrees to about 91 degrees, with a preferred angle A of about 90 degrees.

The prior art wheel disc 14 includes a plurality of spaced apart generally inwardly curved or concave portions or arches 42 (four arches 42 being illustrated in prior art FIG. 2), formed in the outer annular flange 40 thereof. The arches 42 are formed equidistantly around the circumference of the outer annular flange 40 of the wheel disc 14. As shown in prior art FIG. 2, each arch 42 extends radially inwardly relative to a circle defined by the outer side surface 40A of the outer annular portion 40.

Typically, to secure the wheel disc 14 to the wheel rim 12, the wheel rim 12 is held stationary and the wheel disc 14 in inserted therein to a predetermined position and then is welded, as shown at weldment 44 in prior art FIG. 1, to produce the finished vehicle wheel 10. As can be seen in prior art FIG. 1, the predetermined position is operative to position the wheel disc outer surface 40A of the outer annular flange 40 of the wheel disc 14 adjacent an inner surface 26A of the outboard tire bead seat 26 of the wheel rim 14 and to position the end surface 40C of the flange 40 spaced apart from an inner surface 48A of an angled sidewall 48 of the well 24 of the wheel rim 12 by an axial distance or gap G.

The joining of the prior art wheel rim 12 to the prior art wheel disc 14 by welding may include any suitable type of weldment 44, such as a single continuous weld or a plurality of individual or separate welds. Typically, in the case of the latter, four equidistantly spaced welds 44 of approximately thirty degrees are used to secure the wheel rim 12 and the wheel disc 14 together. The structure and operation of the prior art fabricated bead seat attached vehicle wheel 10 thus far described is conventional in the art.

Figure 3:
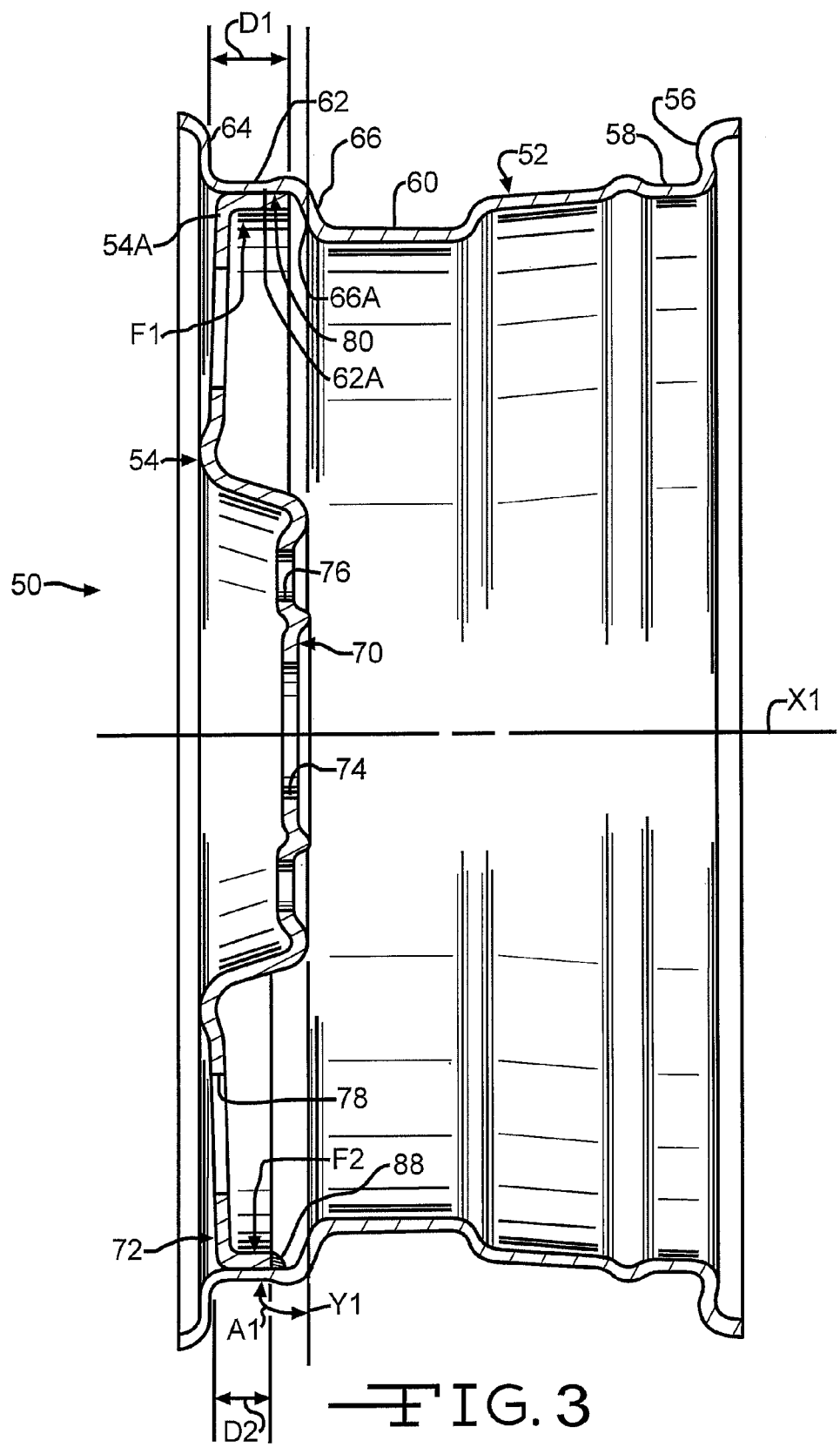
FIG. 3 is a sectional view of a first embodiment of a fabricated bead seat attached vehicle wheel.

Turning now to FIG. 3, there is illustrated a sectional view of a first embodiment of a fabricated bead seat attached vehicle wheel, indicated generally at 50, according to an embodiment of the invention. As shown therein, in this embodiment the fabricated bead seat attached vehicle wheel 50 includes a wheel rim 52, a wheel disc 54 and defines a wheel axis X1. The wheel rim 52 is cast, forged, fabricated or otherwise formed from a suitable material, such as for example, steel, aluminum or alloys thereof, steel, magnesium, or titanium. The wheel rim 52 includes an inboard tire bead seat retaining flange 56, an inboard tire bead seat 58, a generally axially extending well 60, an outboard tire bead seat 62, and an outboard tire bead seat retaining flange 64. The well 60 includes an angled sidewall 66 having an inner surface 66A.

The wheel disc 54 is cast, forged, fabricated or otherwise formed from a suitable material, such as for example, steel, aluminum or alloys thereof, steel, magnesium, or titanium. The wheel disc 54 includes a generally centrally located wheel mounting portion 70 and an outer annular portion 72. The wheel mounting portion 70 includes a center hub hole 74 and a plurality of lug bolt mounting holes 76 (one of such lug bolt mounting holes 76 illustrated in FIG. 3 and five of such lug bolt mounting holes 76 illustrated in FIGS. 4 and 5). The outer annular portion 72 includes a plurality of windows 78 (two of such windows 78 illustrated in FIG. 3 and fourteen of such windows 78 illustrated in FIGS. 4 and 5).

Figure 4:
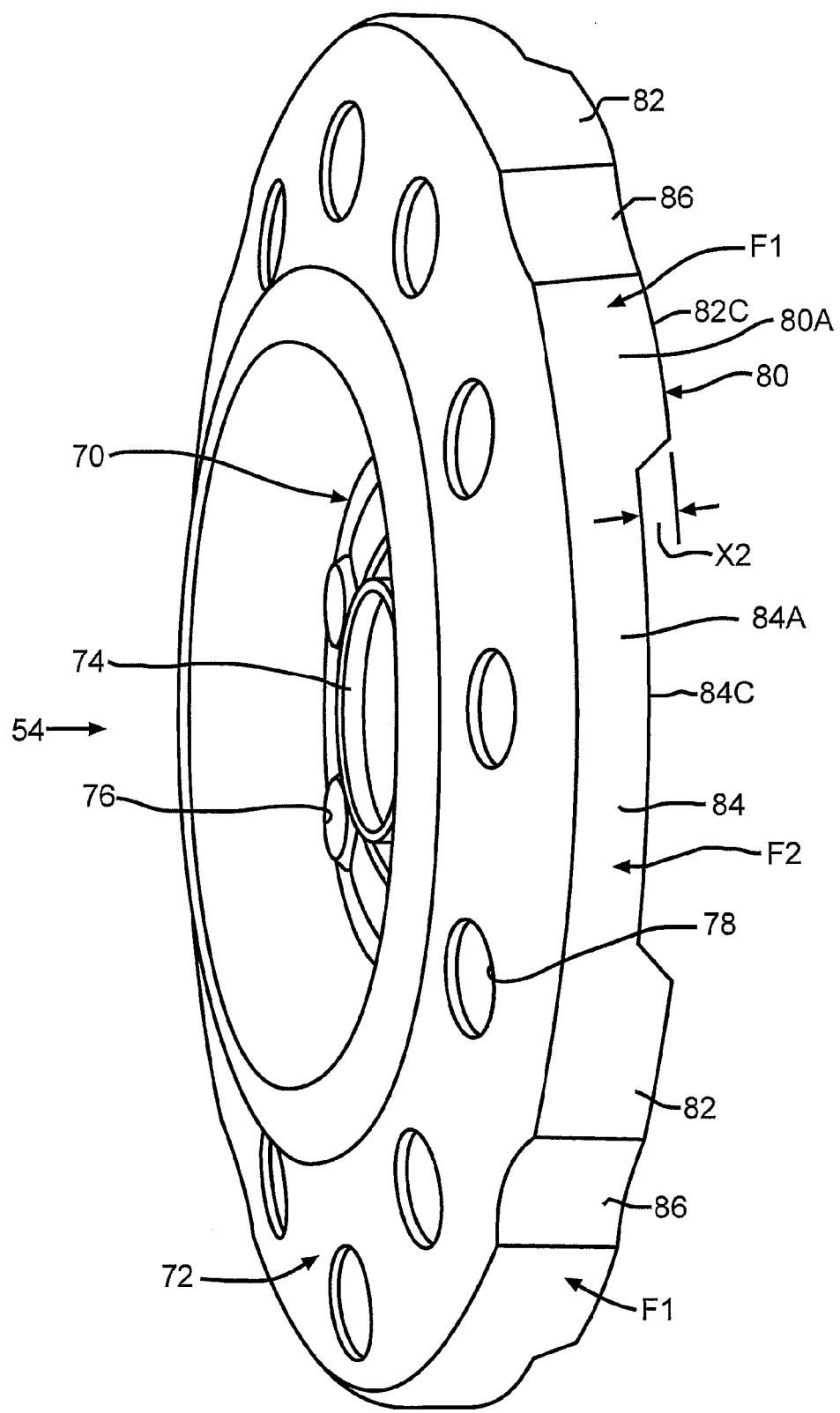
FIG. 4 is a view of the wheel disc of the fabricated bead seat attached vehicle wheel illustrated in FIG. 3.
Figure 5:
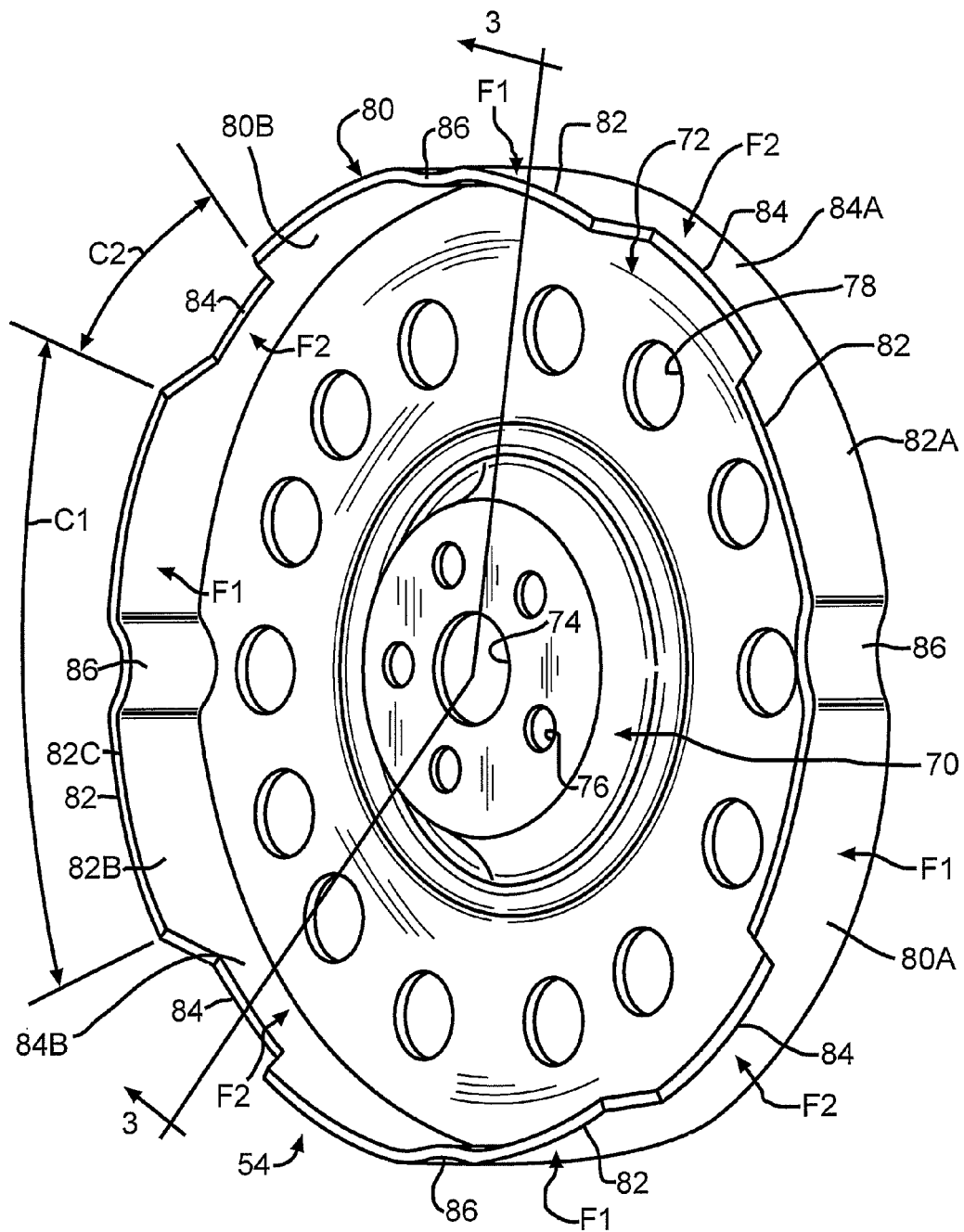
FIG. 5 is another view of the wheel disc of the fabricated bead seat attached vehicle wheel illustrated in FIG. 3.

The outer annular portion 72 of the wheel disc 54 defines a wheel disc outer annular leg or flange, indicated generally at 80. As best shown in FIGS. 4 and 5, the flange 80 is segmented or non-continuous around its circumference. In particular, in the illustrated embodiment the flange 80 includes a first plurality of segments or sections 82 and a second plurality of segments or sections 84. In the illustrated embodiment, the segments 82 and 84 alternate in series around the circumference of the flange 80. Thus, in the illustrated embodiment, the number of the segments 82 and 84 are the same with four of each segments 82 and 84 being shown in the illustrated embodiment.

In the illustrated embodiment, each of the first segments 82 extends a first circumferential distance or angular extent C1. The first distance C1 is preferably in the range from about 45 degrees to about 75 degrees. More preferably, the first distance C1 is in the range from about 55 degrees to about 65 degrees. In the illustrated embodiment, the first distance C1 is approximately about 60 degrees.

Each first segment 82 includes a generally axially extending outer side surface 82A, a generally axially extending inner side surface 82B, and a generally radially extending end surface 82C. Typically, the outer side surface 82A of the first segment 82 of the wheel disc 54 is oriented at a predetermined angle A1, shown in FIG. 3, relative to a vertical axis Y1 of the wheel 50. Typically, the angle A1 is in the range from about 89 degrees to about 91 degrees, with a preferred angle A1 of about 90 degrees.

In the illustrated embodiment, the end surface 82C of each of the first segments 82 extends a first axial distance D1, as shown in FIG. 3, relative to an adjacent outer surface 54A of the wheel disc 54 and which is operative to define a first flange, indicated generally at F1, of each of the first segments 82. In the illustrated embodiment, each first segment 82 includes an inwardly curved or concave portion or arch 86 formed therein generally approximately in the center of each of the first segments 82. Alternatively, the configuration, spacing, angular extent and/or the number of any of the plurality of the first segments 82 may be other than illustrated if so desired.

In the illustrated embodiment, each of the second segments 84 extends a second circumferential distance or angular extent C2 which, in the illustrated embodiment is preferably less than the circumferential distance C1 of the segments 82. The second distance C2 is preferably in the range from about 15 degrees to about 50 degrees. More preferably, the second distance C2 is in the range from about 25 degrees to about 35 degrees. In the illustrated embodiment, the second distance C2 is approximately about 30 degrees. Alternatively, the first distance C1 and the second distance C2 may be other than illustrated if so desired. Preferably, the first distance C1 will be equal to or greater than the second distance C2; however, the second distance C2 may be greater than the first distance C1 if so desired.

Each second segment 84 includes a generally axially extending outer side surface 84A, a generally axially extending inner side surface 84B, and a generally radially extending end surface 84C. The outer side surface 84A and the inner side surface 84B of each of the second segments 84 corresponds to the outer side surface 82A and the inner side surface 82B, respectively, of each of the first segments 82 so as to define a generally constant or uniform outer side surface 80A and inner side surface 80B of the flange 80.

In the illustrated embodiment, the end surface 84C of each of the segments 84 is spaced inwardly a predetermined axial distance X2, as shown in FIG. 4, relative to the end surface 82C of each of the segments 82. As a result of this, in the illustrated embodiment, the end surface 84C of each of the second segments 84 extends a second axial distance D2, as shown in FIG. 3, relative to the adjacent outer surface 54A of the wheel disc 54 and which is operative to define a second flange, indicated generally at F2, of each of the second segments 84.

In the illustrated embodiment for a purpose to be discussed below, the second axial distance D2 is less then the first axial distance D1 so that the second flange F2 of each of the second segments 84 is shorter than the first flange F1 of each of the first segments 82. Alternatively, the configuration, spacing, angular extent and/or the number of any one of the plurality of the second segments 84 may be other than illustrated if so desired. In addition, while this embodiment discloses two different segments 82 and 84 about the flange 80 the flange 80 may include more than two different segments if so desired.

To secure the wheel disc 54 to the wheel rim 52, the wheel rim 52 is preferably held stationary and the wheel disc 54 is inserted therein to a predetermined position and then is welded to produce the finished vehicle wheel 50. Preferably, during the insertion of the wheel disc 54 to the predetermined position, the wheel disc 54 is inserted until the wheel disc 54 is inserted to a predetermined position within the wheel rim 52, or until the end surfaces 82C of the first segments 82 of the flange 80 engage or "bottom out" on the inner surface 66A of an angled sidewall 66 of the well 60 of the wheel rim 52. Once the wheel disc 54 has been inserted to the predetermined position, welds 88 are provided in each of the second segments 84 at the interface between the end surfaces 84C thereof and an adjacent inner surface 62A of the bead seat 62 of the wheel rim 52 to secure the wheel disc 54 and the wheel rim 52 together and produce the fabricated bead seat attached vehicle wheel 50 shown in this embodiment. The welds 88 may be of any suitable type, such as for example, gas metal arc welds. Alternatively, the relative movement and/or fixation of the wheel rim 52 and the wheel disc 54 may be other than illustrated if so desired. In addition, if desired, one or more suitable welds could be provided at the first flange F1 of one or more of the first segments 82. Suitable welds at the first flange F1 may include, for example, laser welds and e-beam welds.

Figure 6:
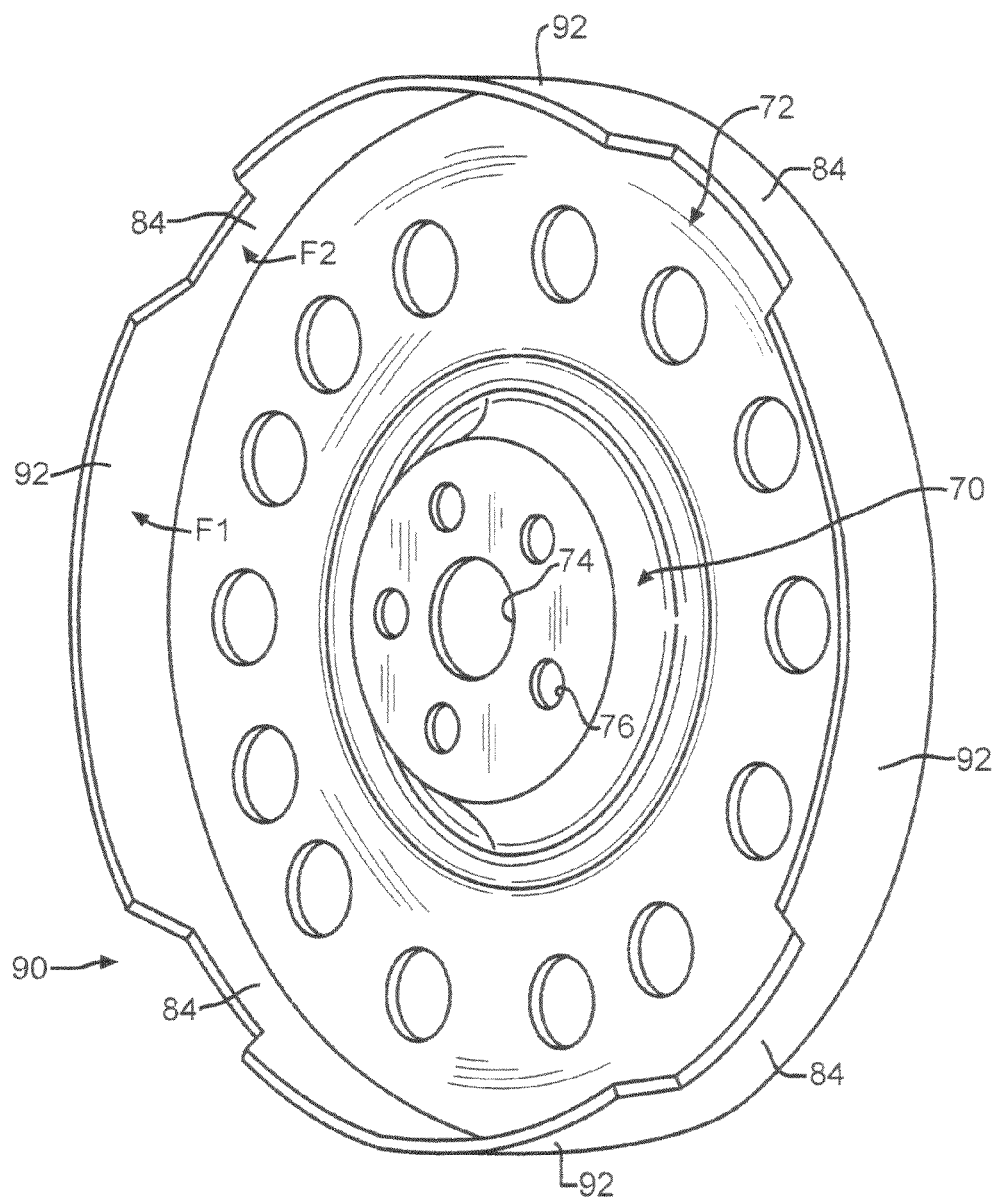
FIG. 6 is a view of a second embodiment of a wheel disc for use in a fabricated bead seat attached vehicle wheel.

Turning now to FIG. 6 and using like reference numbers to indicate corresponding parts, there is illustrated a plan view of a second embodiment of a wheel disc, indicated generally at 90, which can be used in place of the wheel disc 54 shown in FIGS. 3-5 for use producing a fabricated bead seat attached vehicle wheel according to an embodiment of the invention. In this embodiment, the wheel disc 90 is similar to the wheel disc 54 except that the wheel disc 90 includes a plurality of first segments 92 which do not include an arches 86 formed therein like the first segments 82 of the wheel disc 54. But for this difference, the construction of the wheel disc 90 may generally be the same as that of the wheel disc 54 discussed above in connection with FIGS. 3-5. Thus, the wheel disc 90 is secured to a wheel rim in a similar manner described above in connection with the embodiment of the wheel disc 54 shown in FIGS. 3-5.

Figure 7:
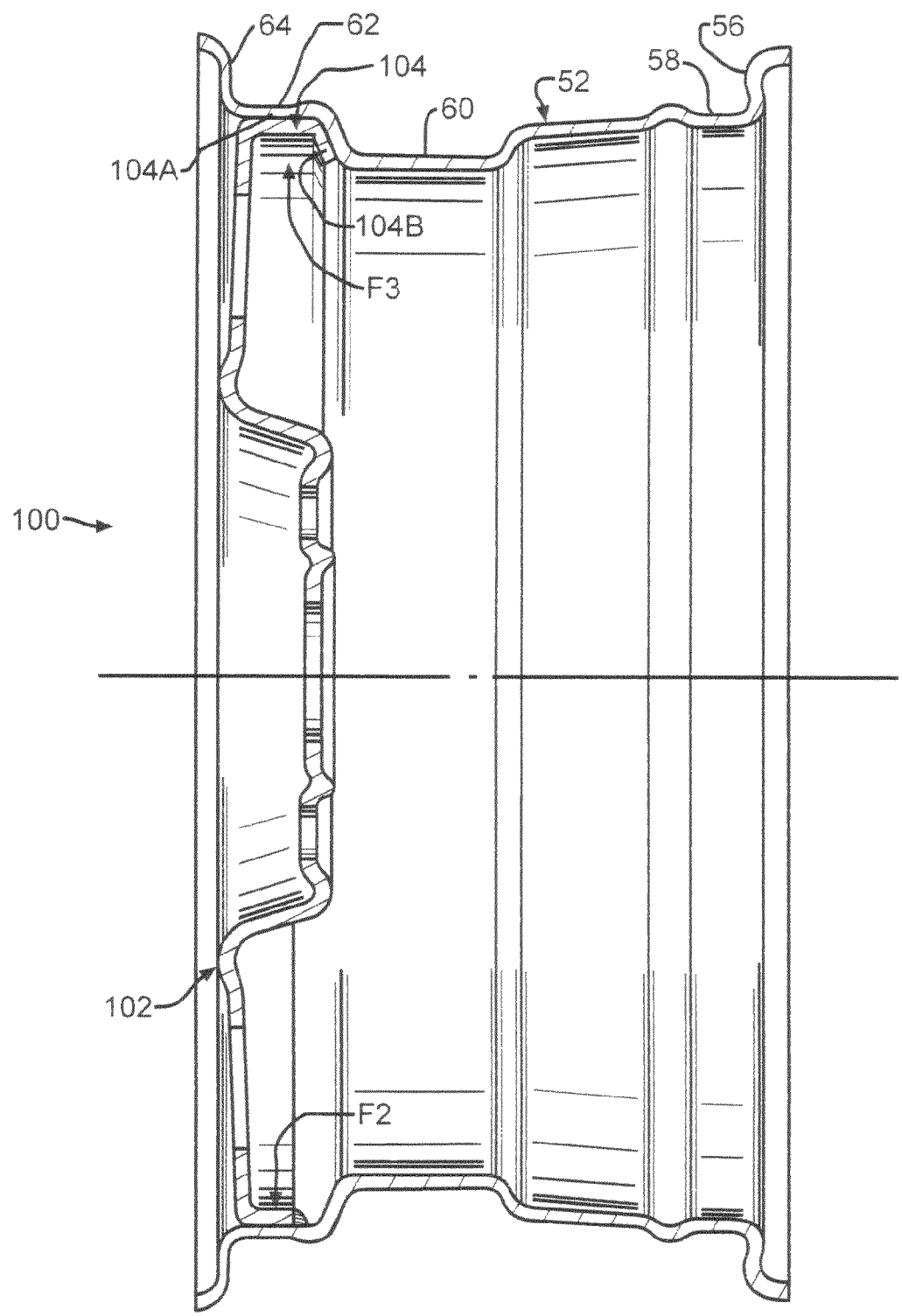
FIG. 7 is a sectional view of a third embodiment of a fabricated bead seat attached vehicle wheel.

Turning now to FIG. 7 and using like reference numbers to indicate corresponding parts, there is illustrated a sectional view of a third embodiment of a fabricated bead seat attached vehicle wheel, indicated generally at 100. In this embodiment, the vehicle wheel 100 includes a wheel disc 102 which is generally the same as the wheel disc 54 except that the wheel disc 102 includes a plurality of first segments 104 each of which are operative to define a first flange, indicated generally at F3, of each of the first segments 104 which is different than the first flange F1 of the wheel disc 54. In this embodiment, the first flange F3 of each of the first segments 104 of the wheel disc 102 includes a generally axially extending first section 104A and a generally radially inwardly extending second section 104B. The second section 104B may be a continuous section or may be a segmented section comprised of a plurality of tabs separated from one another. But for this difference of the second section 104B, the construction of the fabricated bead seat attached vehicle wheel 100 may be generally the same as that of the fabricated bead seat attached vehicle wheel 50 discussed above in connection with FIGS. 3-5. Thus, the wheel disc 102 is secured to the wheel rim 52 in a similar manner described above in connection with the embodiment of the wheel disc 54 shown in FIGS. 3-5.

In accordance with the provisions of the patent statutes, the principle and mode of operation of this invention have been described and illustrated in its various embodiments. However, it must be understood that the invention may be practiced otherwise than as specifically explained and illustrated without departing from the scope or spirit of the attached claims.

What is claimed is:

1. A fabricated bead seat attached vehicle wheel comprising:
   a wheel rim including an inboard tire bead seat retaining flange, an inner tire bead seat, a well, an outer tire bead seat, and an outboard tire bead seat retaining flange; and
   a wheel disc joined to said wheel rim and defining a wheel axis, said wheel disc including a generally centrally located wheel mounting portion and an outer annular portion which defines a wheel disc outer flange;
   wherein said wheel disc outer annular flange is segmented around a circumference thereof and includes at least a first plurality of segments and a second plurality of segments, said first plurality of segments extending a first axial distance relative to an adjacent outer surface of said wheel disc and said second plurality of segments extending a second axial distance relative to said adjacent outer surface of said wheel disc which is less than said first axial distance;
   wherein each of said plurality of first segments extends a first circumferential distance and each of said second plurality of segments extends a second circumferential distance which is less than said first circumferential distance;
   wherein each of said first plurality of segments further includes a generally axially extending inner side surface, and a generally radially extending end surface, and each of said second plurality of segments further includes a generally axially extending inner side surface, and a generally radially extending end surface;
   wherein said radially extending end surface of each of said second plurality of segments is spaced inwardly an axial distance relative to said radially extending end surface of each of said first plurality of segments;
   wherein said radially extending end surface of each of said first plurality of segments engages an inner surface of an angled sidewall of said well of said wheel rim and said radially extending end surface of each of said second plurality of segments is spaced apart a distance from said inner surface of said angled sidewall of said well of said wheel rim; and wherein said radially extending end surface of said second plurality of segments is spaced apart said distance from said inner surface of said angled sidewall of said well of said wheel rim to define a space therebetween for receiving a weld between each respective radially extending end surface of said second plurality of segments and an inner surface of said outer tire bead seat to thereby secure said wheel rim and said wheel disc together.

2. The fabricated bead seat attached vehicle wheel of claim 1 wherein said first circumferential distance is at least twice said second circumferential distance.

3. The fabricated bead seat attached vehicle wheel of claim 1 wherein said first and second plurality of segments alternate in series around a circumference of said wheel disc outer annular flange.

4. The fabricated bead seat attached vehicle wheel of claim 3 wherein said wheel disc outer annular flange includes four of each of said first and second plurality of segments.

5. The fabricated bead seat attached vehicle wheel of claim 4 wherein said first circumferential distance of each of said first plurality of segments is in the range from about 45 degrees to about 75 degrees and said second circumferential distance of each of said second plurality of segments is in the range from about 15 degrees to about 50 degrees.

6. The fabricated bead seat attached vehicle wheel of claim 1 wherein at least one of said first plurality of segments includes an inwardly curved arch provided therein.

7. The fabricated bead seat attached vehicle wheel of claim 6 wherein each of said first plurality of segments includes an inwardly curved arch provided therein.

8. The fabricated bead seat attached vehicle wheel of claim 7 wherein each of the arches is centrally located in each of said first plurality of segments.

9. A wheel disc adapted for use in producing a fabricated bead seat attached vehicle wheel comprising:

a wheel disc including a centrally located wheel mounting portion and an outer annular portion which defines a wheel disc outer flange, wherein said wheel disc outer annular flange is segmented around a circumference thereof and includes at least a first plurality of segments and a second plurality of segments, said first plurality of segments extending a first axial distance relative to an adjacent outer surface of said wheel disc and said second plurality of segments extending a second axial distance relative to said adjacent outer surface of said wheel disc which is less than said first axial distance;

wherein each of said plurality of first segments extends a first circumferential distance and each of said second plurality of segments extends a second circumferential distance which is less than said first circumferential distance;

wherein each of said first plurality of segments further includes a generally axially extending inner side surface, and a generally radially extending end surface, and each of said second plurality of segments further includes a generally axially extending inner side surface, and a generally radially extending end surface;

wherein said radially extending end surface of each of said second plurality of segments is spaced inwardly an axial distance relative to said radially extending end surface of each of said first plurality of segments;

wherein said radially extending end surface of each of said first plurality of segments engages an inner surface of an angled sidewall of said well of said wheel rim and said radially extending end surface of each of said second plurality of segments is spaced apart a distance from said inner surface of said angled sidewall of said well of said wheel rim; and wherein said radially extending end surface of said second plurality of segments is spaced apart said distance from said inner surface of said angled sidewall of said well of said wheel rim to define a space therebetween for receiving a weld between each respective radially extending end surface of said second plurality of segments and an inner surface of said outer tire bead seat to thereby secure said wheel disc to a wheel rim to produce a fabricated bead seat attached vehicle wheel.

10. The fabricated bead seat attached vehicle wheel of claim 9 wherein said first circumferential distance is at least twice said second circumferential distance.

11. The fabricated bead seat attached vehicle wheel of claim 9 wherein said first and second plurality of segments alternate in series around a circumference of said wheel disc outer annular flange.

12. The wheel disc of claim 11 wherein said wheel disc outer annular flange includes four of each of said first and second plurality of segments.

13. The wheel disc of claim 12 wherein said first circumferential distance of each of said first plurality of segments is in the range from about 45 degrees to about 75 degrees and said second circumferential distance of each of said second plurality of segments is in the range from about 15 degrees to about 50 degrees.

14. The wheel disc of claim 9 wherein at least one of said first plurality of segments includes an inwardly curved arch provided therein.

15. The wheel disc of claim 14 wherein each of said first plurality of segments includes an inwardly curved arch provided therein.

16. The wheel disc of claim 15 wherein each of the arches is centrally located in each of said first plurality of segments.

17. A method for producing a fabricated bead seat attached vehicle wheel comprising the steps of:

(a) providing a wheel rim including an inboard tire bead seat retaining flange, an inner tire bead seat, a well, an outer tire bead seat, and an outboard tire bead seat retaining flange;

(b) providing a wheel disc defining a wheel axis and including a generally centrally located wheel mounting portion and an outer annular portion which defines a wheel disc outer flange, wherein the wheel disc outer annular flange is segmented around a circumference thereof and includes at least a first plurality of segments and a second plurality of segments, wherein the first plurality of segments extending a first axial distance relative to an adjacent outer surface of the wheel disc and the second plurality of segments extending a second axial distance relative to the adjacent outer surface of the wheel disc which is less than the first axial distance wherein each of the plurality of first segments extends a first circumferential distance and each of the second plurality of segments extends a second circumferential distance which is less than the first circumferential distance, wherein each of the first plurality of segments further includes a generally axially extending inner side surface, and a generally radially extending end surface, and each of the second plurality of segments further includes a generally axially extending inner side surface, and a generally radially extending end surface, wherein the radially extending end surface of each of the second plurality of segments is spaced inwardly an axial distance relative to the radially extending end surface of each of the first plurality of segments;

(c) moving at least one of the wheel rim and wheel disc relative to the other until the radially extending end surface of each of the first plurality of segments engages an inner surface of an angled sidewall of the well of the wheel rim and the radially extending end surface of each of the second plurality of segments is spaced apart a distance from the inner surface of the angled sidewall of the well of the wheel rim to define a space therebetween for receiving a weld; and (d) securing the wheel rim and the wheel disc together by depositing a weld between each respective radially extending end surface of said second plurality of segments and an inner surface of said outer tire bead seat in the space formed between the radially extending end surface of each of the second plurality of segments and the inner surface of the angled sidewall of the well of the wheel rim to thereby produce the fabricated bead seat attached vehicle wheel.

18. The method of claim 17 wherein in step (b) at least one of the first plurality of segments includes an inwardly curved arch provided therein.

19. The method of claim 18 wherein in step (b) each of the first plurality of segments includes an inwardly curved arch provided therein.

20. The method of claim 19 wherein each of the arches is centrally located in each of the first plurality of segments.

21. The method of claim 17 wherein the first and second plurality of segments alternate in series around the circumference of the wheel disc outer annular flange, and wherein the wheel disc outer annular flange includes four of each of the first and second plurality of segments.

22. The method of claim 21 wherein the first circumferential distance of each of the first plurality of segments is in the range from about 45 degrees to about 75 degrees and the second circumferential distance of each of the second plurality of segments is in the range from about 15 degrees to about 50 degrees.

* * * * *